(12) United States Patent
Brereton et al.

(10) Patent No.: US 10,679,178 B2
(45) Date of Patent: *Jun. 9, 2020

(54) BIG DATA SOURCING SIMULATOR

(71) Applicant: INTERNATIONAL BUSINESS MACHINES CORPORATION, Armonk, NY (US)

(72) Inventors: JoAnn Piersa Brereton, Hawthorne, NY (US); Ajay Ashok Deshpande, White Plains, NY (US); Arun Hampapur, Norwalk, CT (US); Miao He, Beijing (CN); Alan Jonathan King, South Salem, NY (US); Xuan Liu, Yorktown Heights, NY (US); Christopher Scott Milite, Oxford, CT (US); Jae-Eun Park, Wappinger Falls, NY (US); Joline Ann Villaranda Uichanco, Quezon (PH); Songhua Xing, Staten Island, NY (US); Steve Igrejas, Newton, NH (US); Hongliang Fei, Millwood, NY (US); Vadiraja Ramamurthy, McKinney, TX (US); Yingjie Li, Chappaqua, NY (US); Kimberly D. Hendrix, New Albany, OH (US); Xiao Bo Zheng, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 649 days.

This patent is subject to a terminal disclaimer.

(21) Appl. No.: 14/955,509

(22) Filed: Dec. 1, 2015

(65) Prior Publication Data
US 2016/0110735 A1  Apr. 21, 2016

Related U.S. Application Data

(63) Continuation of application No. 14/881,570, filed on Oct. 13, 2015.
(Continued)

(51) Int. Cl.
*G06Q 10/08* (2012.01)
*G06Q 30/02* (2012.01)
*G06Q 10/06* (2012.01)

(52) U.S. Cl.
CPC ......... *G06Q 10/087* (2013.01); *G06Q 10/067* (2013.01); *G06Q 30/0202* (2013.01)

(58) Field of Classification Search
USPC .................. 705/7.36, 330, 7.31, 28; 700/291
See application file for complete search history.

(56) References Cited

U.S. PATENT DOCUMENTS

| 7,212,976 | B2 | 5/2007 | Scheer | |
| 7,747,543 | B1 * | 6/2010 | Braumoeller | G06Q 10/083 |
| | | | | 705/330 |

(Continued)

*Primary Examiner* — Oluseye Iwarere
*Assistant Examiner* — Reva R Moore
(74) *Attorney, Agent, or Firm* — F. Chau & Associates, LLC

(57) ABSTRACT

A simulator is configured to simulate the fulfillment of orders by nodes. Each node has an inventory of products and is capable of shipping the products to destinations in response to receipt of a corresponding order. The simulator divides the nodes into groups and assigns a different priority to each group based on input provided by a user to the simulator to generate an ordered sequence of priorities. The simulator maintains safety stock data corresponding to each node that indicates minimum quantities of the products required to be present at the corresponding node. The simulator selects a current priority of the sequence and next simulates a first group among the groups having the current priority fulfilling the orders for a given product among the (Continued)

products while a quantity of the given product at each of the nodes in the first group is below the minimum quantity in the corresponding safety stock data.

9 Claims, 17 Drawing Sheets

Related U.S. Application Data

(60) Provisional application No. 62/064,192, filed on Oct. 15, 2014.

(56) References Cited

U.S. PATENT DOCUMENTS

| | | |
|---|---|---|
| 7,781,145 B2 | 8/2010 | Lee et al. |
| 8,121,876 B1 | 2/2012 | Braumoeller et al. |
| 8,374,922 B1 | 2/2013 | Antony |
| 8,428,987 B2 | 4/2013 | Najmi et al. |
| 8,498,888 B1 | 7/2013 | Raff et al. |
| 8,595,077 B2 | 11/2013 | Koegler et al. |
| 8,644,983 B1 | 2/2014 | Barua et al. |
| 8,660,904 B2 | 2/2014 | Koegler et al. |
| 8,762,322 B2 | 6/2014 | Sridharan et al. |
| 8,818,836 B1 | 8/2014 | Braumoeller et al. |
| 2002/0138358 A1* | 9/2002 | Scheer ................. G06Q 10/063 705/7.36 |
| 2005/0055137 A1* | 3/2005 | Andren .................. G06Q 30/02 700/291 |
| 2014/0304034 A1* | 10/2014 | Mitchell ............ G06Q 30/0202 705/7.31 |

* cited by examiner

RETAILER   Sourcing Simulation   Home   Administration   Applications   More...                                admin | Edit My Profile
Manage Sourcing Scenario   Run & Monitor Simulation   Analyze & Report   Region Management   scenario config         ● All Sourc Create Scenario
[Create Scenario]

Default List Try 2                Scenario Name:* [        ]
Default SKU List Try              Select Sourcing Model: [Rule based model ▼]
Jason test                        Select Orders to Stimulate:   Start Date: [11/24/2013]    End Date: [12/17/2013]
JoAnn 22/SS PEAK test                       Demand increase projection '       ' %
Keep it together R 1000 SKU 2013  Set Simulation Parameters:
Keep it together R 1000 SKU 2014            Radius: [500] miles
Keep it together R 2000 SKU 2013  Select SFS Eligible SKU list:  [2013 PEAK SFS SKU List ▼]
Keep it together R 2000 SKU 2014            SFS store list:  [SFS_STORES_222 ▼]
Keep it together R 500 SKU 2013   ☑ Enable Store CAP    Level1: [800] Level2: [800] Level3: [600] Level4: [600] Level5: [550] Level6: [400]
Keep it together R 500 SKU 2013 High CAP
Keep it together R 500 SKU 2013 No Safety Stock   ☐ Enable EFC Capacity   TX EFC: [  ]  OX EFC: [  ]  MD EFC: [  ]  CA EFC: [  ]
Keep it together R 500 SKU 2013_Revised Capacity  ☑ Enable Safety Stock  [2013 PEAK SFS SKU List ▼]
Keep it together R 500 SKU 2013_Revised Capacity 2
Keep it together R 500 SKU 2014   Split:    ● Keep It All Together  ○ Split Mix Orders  ○ Multiple Split
Keep it together R 750 SKU 2013 No Safety Stock
                                                                               [Save] [Reset] [Delete]
Option 1
Option 10
Option 11

FIG. 4

| KPI | Definition | Comments | Financial mapping |
|---|---|---|---|
| Number of packages per order for SFS | =Order quantity / Number of Shipments to fulfill that order | Applies to EFCs as well Compare each EFC vs. SFS. Is a customer-centric way to understand splits. | Shipping cost (average shipping cost per order--part of TCS) |
| Number of cancels/resourcing per order for SFS | =orders/resourced orders | Track number of touches per order for SFS versus EFCs. Measure of efficiency. | Sales $--link to customer order cancellations, customer satisfaction ratings Operating Expense $-- shipping costs for any expedited shipments and for multiple packages |
| Cost per unit (CPU) --per day or per defined time period in aggregate | =Labor costs for SFS/Units shipped | EFC corollary: =Labor costs/units shipped | Operating Expense $-- labor/fulfillment costs |
| Total Cost to Serve | =labor costs + shipping costs + penalty costs (backlog, markdown, customer service, etc.) | EFC versus SFS | Operating Expense $ (shipping cost, labor/fulfillment cost) |
| Speed of Service (number of days to fulfill | =shipment date-order date | Alternative: =shipment date-SLA date | TBD--probably Sales |
| Markdowns avoided | =realized pre-markdown margin dollars versus planned, post-markdown margin dollars | Need to clarify best way to identify markdown risk styles/skus and calculate cost of markdown savings due to SFS | Margin $ (lower MD$) |
| Units Ordered as a % of Unit Capacity | =units orders/units capacity | Does SFS provide enough capacity to support ecomm growth? | CapEx $ Savings (years of savings before needing an additional EFCC) |

FIG. 12

BIG DATA SOURCING SIMULATOR

CROSS-REFERENCE TO RELATED APPLICATION

This application is a continuation application of co-pending U.S. application Ser. No. 14/881,570 filed Oct. 13, 2015, which claims priority to U.S. provisional application Ser. No. 62/064,192 filed Oct. 15, 2014, the disclosures of which are each hereby incorporated by reference herein in their entireties.

BACKGROUND

1. Technical Field

The present disclosure relates to the field of simulators, and more particularly to a sourcing simulator to support design of a fulfillment network.

2. Discussion of Related Art

A number of industries use an order management system (OMS), which is a computer software system for entry of orders and fulfillment of those orders. The orders can be received from businesses, consumers, or a mix of both depending on the products. OMS has a centralized view of inventory, which may include on hand goods and goods that will be received at a future date. The OMS allows users to create fulfillment rules, which specify how an order is to be fulfilled. However, with the increasing competition from online retailers, and for enabling an omni-channel customer experience, retailers have begun using options such as ship from store, same day delivery, or buy online and pickup in store. This adds a lot of variables in terms of setting up of the fulfillment rules. To create an omni-channel experience, retailers strive to meet different competing business objectives such as minimizing shipping costs, avoiding markdowns, maximizing customer satisfaction, and reducing workloads in certain facilities. However, it can be difficult to generate rules to meet these competing business objectives and that support the sheer enormity of data in these settings.

BRIEF SUMMARY

According to an exemplar embodiment of the invention, a simulator is configured to simulate fulfillment of orders by a plurality of physical distribution nodes. The simulator includes: a processor; a memory storing a computer program configured to simulate the fulfillment of the orders; and a processor configured to execute the computer program. Each node has an inventory of products and is capable of shipping the products to destinations in response to receipt of a corresponding order. The computer program divides the nodes into groups and assigns a different priority to each group based on input provided by a user of the simulator to generate an ordered sequence of priorities. The computer program maintains safety stock data corresponding to each node that indicates minimum quantities of the products required to be present at the corresponding node. The computer program selects a current priority of the sequence and next simulates a first group among the groups having the current priority fulfilling the orders for a given product among the products while a quantity of the given product at each of the nodes in the first group is below the minimum quantity in the corresponding safety stock data. According to an exemplar embodiment of the invention, a method of simulating fulfillment of orders by a plurality of physical distribution nodes includes: dividing the nodes into related groups based on input provided by a user, where each node has an inventory of products and is capable of shipping the products to destinations in response to receipt of a corresponding order; assigning a different priority to each group to generate an ordered sequence of priorities; selecting a current priority of the sequence; and simulating a first group among the groups having the current priority fulfilling the orders for a given product among the products while a quantity of the given product at each of the nodes in the first group is below a minimum required quantity.

According to an exemplar embodiment of the invention, a computer program product to simulate fulfillment of orders by a plurality of physical distribution nodes is provided. The computer program product includes a computer readable storage medium having program instructions embodied therewith. The program instructions are executable by a computer to perform the above method.

BRIEF DESCRIPTION OF THE SEVERAL VIEWS OF THE DRAWINGS

Exemplary embodiments of the invention can be understood in more detail from the following descriptions taken in conjunction with the accompanying drawings in which:

FIG. 4 shows an example of the user interface of FIG. 3.

FIG. 12 shows examples of KPIs that can be calculated and presented by the sourcing simulator.

DETAILED DESCRIPTION

Figure 1:
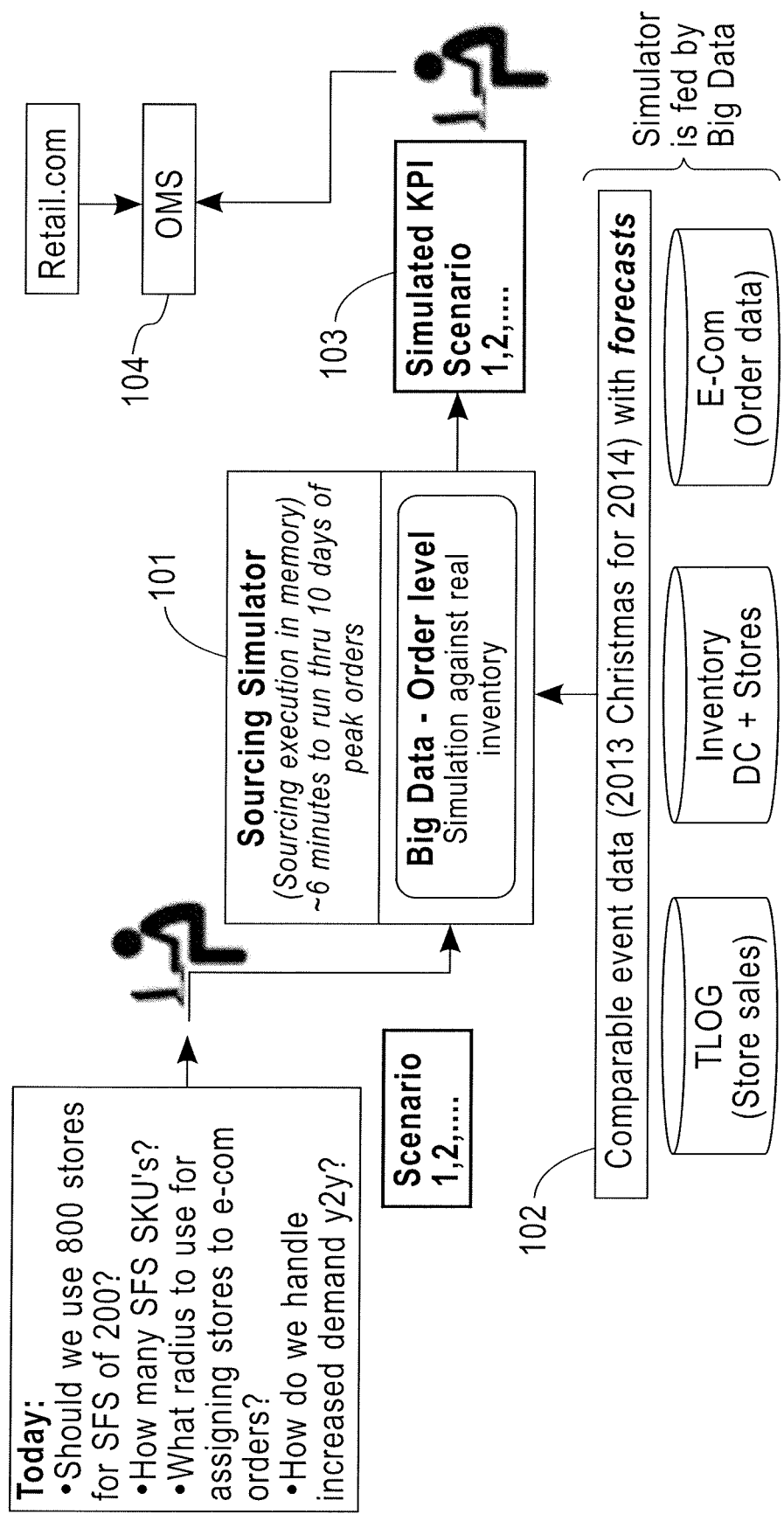
FIG. 1 shows a system including a sourcing simulator according to an exemplary embodiment of the invention.

Embodiments of the present invention relate to methods and/or systems that can conduct a sourcing simulation via a what-if analysis at an order-to-order level. The results of the simulation can be used to design better fulfillment networks.

According to an exemplary embodiment of the invention, a system and method for conducting a sourcing simulation via a what-if analysis at an order-to-order level is provided. More specifically, the system and method allow users to use big data to experiment with different sourcing rules on an order-to-order basis. The system and method enable the design of an order fulfillment network by allowing a user to conduct a what-if analysis at an order by order granularity. The system and method sets up a simulation environment to extract and process data relevant for order by order simulation. The system and method allow a user to set up sourcing rules for fulfillment. The system and method apply user configured rules in the simulation to generate output at an order by order level. The system and method compute and present KPIs to the users so users can compare various scenarios. The system and method create and manage rules based on multiple dimensions of the sourcing logic. The system and method utilize a meta data driven approach to maximize the flexibility of rules configuration. The system and method calculate the key performance indicators (KPIs) at different granularities of time periods, product groups and node groups to provide macro and micro views on the simulation. The system and method enable a view where a user can select, compare and visualize multiple scenarios.

Data may include inventory data, the demand for products within a store, the online demand for the products, past and current customer data, etc., and can be used to compare the performance of different sourcing policies. For example, a user can configure different criteria, such as a specified time period, locations(s), weather, products(s), etc., in the simulation to determine the KPIs. The simulation data can also be used to design and optimize order fulfillment networks, compare the KPIs, compare and visualize various scenarios, optimize storage capacity, and perform other what-if analyses, such as shifting inventory amongst stores or opening new stores.

In an embodiment, a user may input historical data so that the system can learn buying and sourcing patterns based on history. The user could also use the simulator with on-hand data or future forecasted data to play out future outcomes A sourcing rule may specify how to replenish a product in an organization. For example, the sourcing rule could specify that if a small amount of a product is sold it should be sourced from a first location that can supply the product within a week for a lower cost, but if a large amount of the product is sold it should be sourced from a second location that can supply the product in a day, but for a higher cost.

The simulator takes as input the inventory data at the beginning of a simulation period (current and incoming), store and online demand data, product data and sources rules, and does an order by order simulation to compute order assignments and KPIs, and learns which sourcing strategies perform better.

A user can also use the simulator with historical data to do learning based on the past, or use the simulator with on-hand data or future forecasted data to play out future outcomes.

FIG. 1 illustrates a sourcing simulator 101 operating using a database 102 to generate a scenario 103 to assist a user to generate sourcing rules for an order management system OMS 104. The data in the database 102 may come from a server running software (e.g., HADOOP) that enables the distributed processing of large data sets across clusters of commodity servers. The software is designed to scale up from a single server to thousands of machines, with a high degree of fault tolerance. The database 102 stores information on the sale of products (e.g., identifies the products sold, how many of each product has been sold, from which store the sale occurred, etc.), inventory (e.g., how much of each product is available), and order data information (e.g., identifies how many orders for each product are yet to be fulfilled, location order is to be sent, etc.). The database 102 may store historical event data. For example, the database 102 may store historical data such as all the orders placed during a previous period that were designed to be fulfilled for the Christmas holiday (e.g., between last December 15$^{th}$ and December 21st). The simulator 101 can then run a simulation against the real inventory to generate various sourcing scenarios 103 capable of supporting the historical data. The sourcing scenarios may include sourcing rules that can be provided to the OMS 104. The simulator 101 may provided the sourcing rules automatically to the OMS 104.

Figure 2:
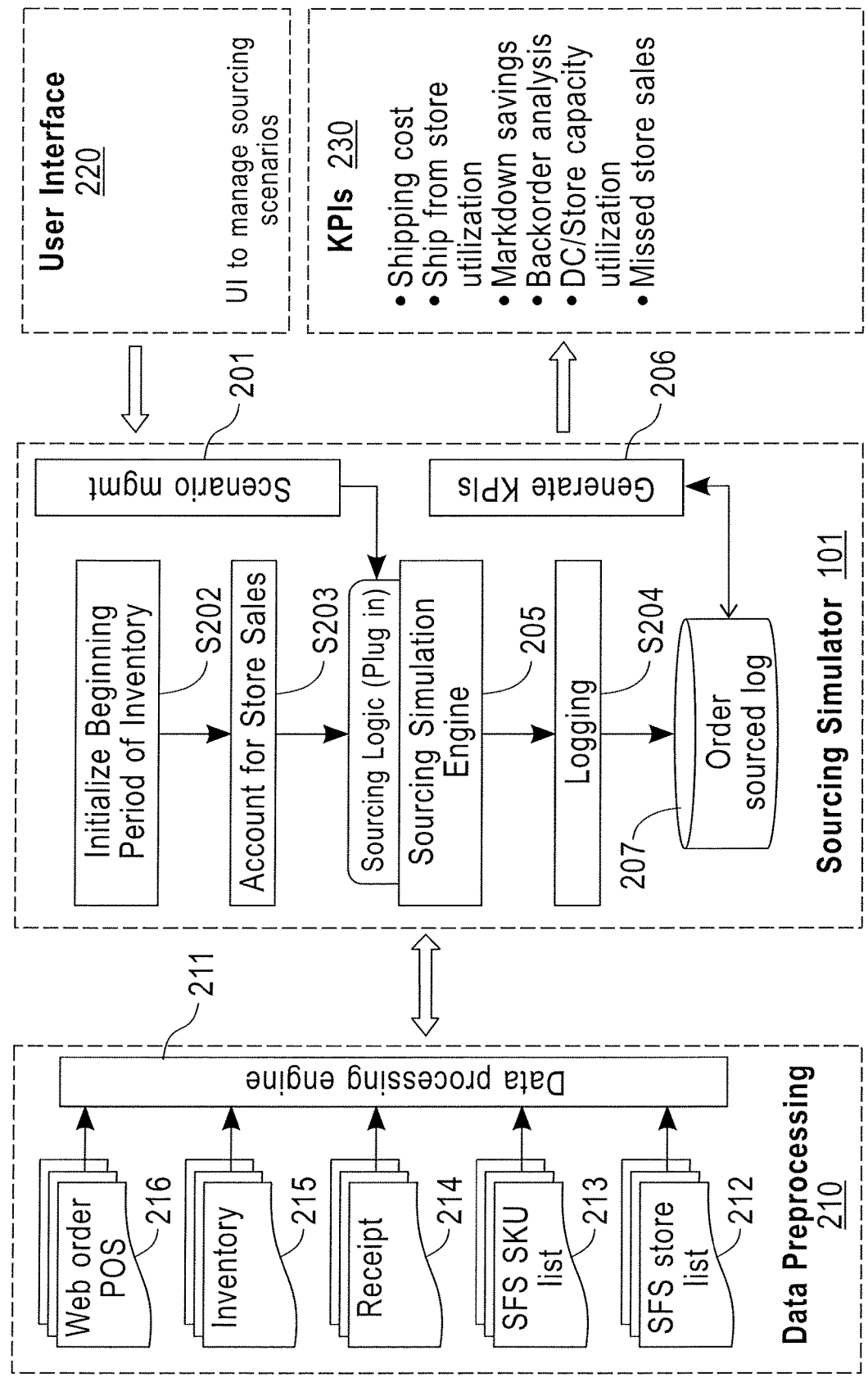
FIG. 2 shows a system including a sourcing simulator according to an exemplary embodiment of the invention.

FIG. 2 illustrates a system according to an exemplary embodiment of the invention that makes use of the sourcing simulator 101. Referring to FIG. 2, the system 101 includes a data preprocessing unit 210, the sourcing simulator 101, and a user interface 220. The data processing unit 210 includes a data processing engine 211 that operates on lists of stores 212, lists of products 213, receipts (sales) 214, available inventories 215 and orders 216 (e.g., WEB generated or point of sale (POS)). The data processing engine 211 may convert the data it operates on into a format suitable for the sourcing simulator 101. The sourcing simulator 101 includes a scenario manager 201, which receives inputs from a user interface 220 that specifies parameters of the scenario. For example, the parameters of the scenario may include a maximum distance between the business and a sourcing location, a maximum travel time between the business and a sourcing location, a maximum amount of $CO_2$ emissions generated as a result of using the sourcing location, etc.

Figure 3:
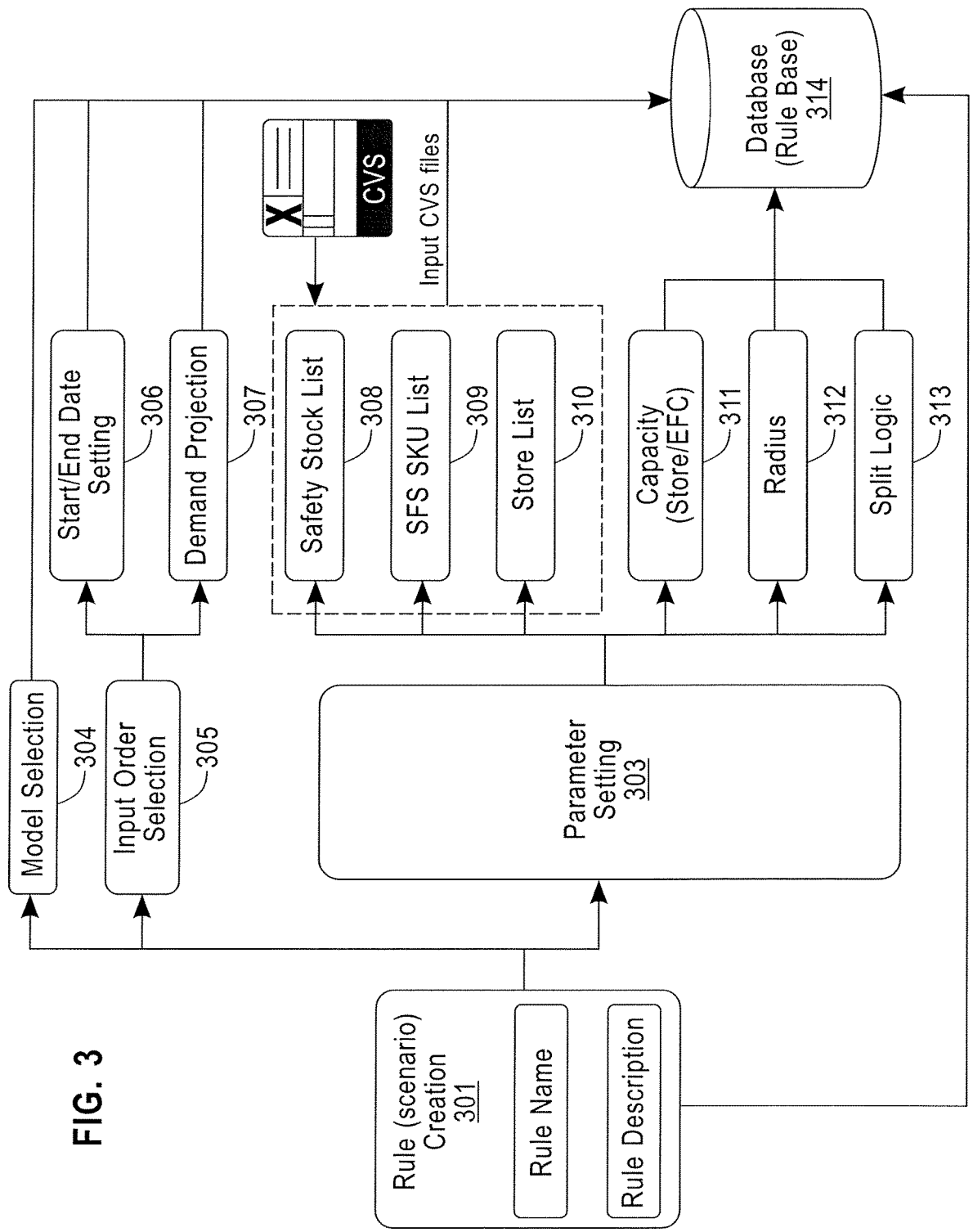
FIG. 3 shows a user interface of the system according to an exemplary embodiment of the invention.

The sourcing simulator 101 initializes the beginning period of the inventory to examine (S202). The sourcing simulator 101 then accounts for store sales (S203). The sourcing simulation engine 205 generates a simulation using the entered parameters with respect to the inventory period and the current sales. The sourcing simulator 101 then logs the orders sourced during the simulation (S204). The orders sourced may be stored in a log 207. A KPI unit 206 can generate one or more KPIs from the orders sourced in the log 207. The KPIs may include a shipping cost, a ship from store utilization, markdown savings, backorder analysis, store capacity utilization, missed store sales, etc. FIG. 3 illustrates a user interface for the user configuration set up. Referring to FIG. 3, the user interface includes a scenarios/rules creation interface 301, which enables a user to create a scenario/rule (e.g., give it a name and a description). The user interface includes a parameter setting interface 303, which enables users to set parameters of the scenario/rule, such as capacity 311, radius 312 (e.g., set radius of sourcing location to examine), and split logic 313 (e.g., setup whether an order can be split so it can be sourced from multiple sourcing locations). The user interface includes a model selection interface 304 (e.g., select between rules based or optimized) and an input order selection interface 305, which includes a control 306 to set the start/end time/date in which orders are to be analyzed and a demand projection control 307. Data collected by the interface can be stored in the database 314. Data can also be imported into the database 314 from CSV files, such as a safety stock list 308 (e.g., indicates certain products can never go below a certain available quantity), a list of product codes 309, and a list of stores 310. FIG. 4 illustrates an example of the user interface illustrated in FIG. 3, which shows a data entry field for entering the scenario name, an option to select the type of mode (e.g., rules based or optimized), fields to specify the time period of prior orders to examine, and a demand projection slider to specify how much to increase or decrease the demand relative to the demand of the orders examined. For example, if there were 10,000 orders during the selected previous period and the demand is increased by 10%, the simulator will assume that the scenario is to have 11,000 orders. The interface includes a field for specifying a radius. For example, among the orders that occurred during the selected period, the simulator will only consider those orders that occurred within a particular radius of the user or a business of the user, or only consider those sourcing locations within the radius. The user interface includes fields that allow the user to specify which of the products are to be considered for ship from store. For example, some products may not be eligible for shipment directly from store to home, and the list of which are eligible can change over time. The interface also allows the user to specify that the simulation is only to occur with respect to a certain subset of stores among the stores that are available. The interface includes an option that allows the simulator to consider safety stock limits (e.g., do not allow the amount of product A to fall below quantity B) in making its assignments. The simulator also allows the user to specify whether splits of orders are allowed (e.g., whether to split an order and have it sourced by multiple sourcing locations).

Figure 5:
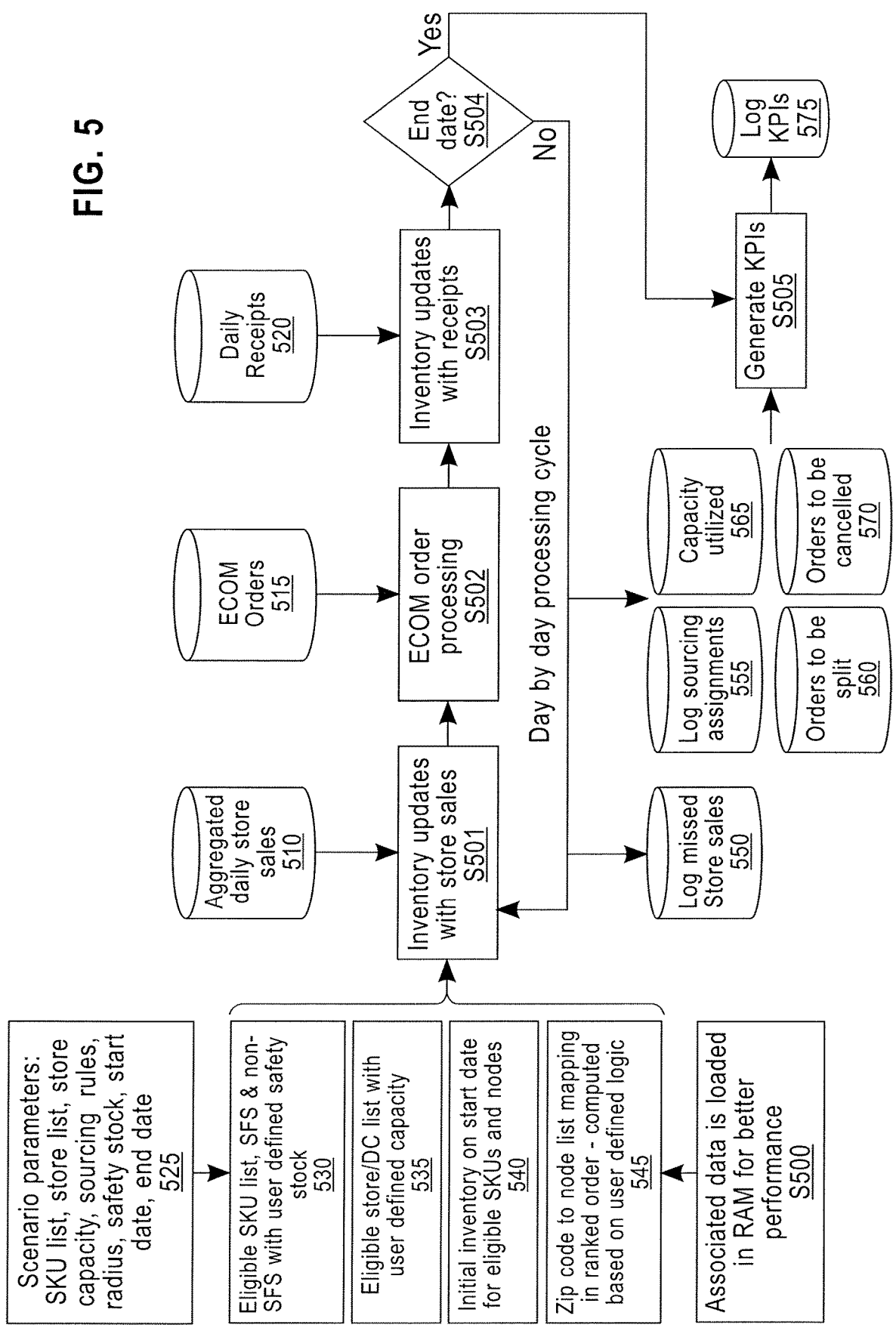
FIG. 5 shows a process flow of the sourcing simulator according to an exemplary embodiment of the invention.

FIG. 5 illustrates a process flow of the sourcing simulator 101 according to an exemplary embodiment of the invention. Inventory updates are performed based on store sales (S501). Daily store sales may be stored and aggregated into a store sales database 510. The inventory may be with respect to eligible product lists or store keeping unit (SKU) lists 530, user defined safety stocks, eligible stores 535, an initial inventory 540, and a zip code to node list mapping 545 in a ranked order. A zip code (of the customers) to node (the stores) mapping in ranked order may be performed and computed based on user defined logic. The associated data used for updating the inventory may be loaded in RAM for better performance (S500). Electronic commerce (ECOM) orders are then processed (S502). The ECOM orders may have been previously stored in orders database 515. Based on actual receipts (sales), the inventory is updated (S503). The receipts may be stored daily on a receipts database 520. A determination of whether the end-date has been reached is performed (S504). If the end date has not yet been reached, the inventory updates continue. If the end-date has been reached, key process indicators (KPIs) are generated (S505) and logged. The KPIs may be stored in a KPI database 575. The process may include the logging of sourcing assignments to storage in database 555, determining of capacity utilizations for storage in database 565, determination of orders to be split for storage in database 560, orders to be cancelled for storage in database 570, missed store sales, which may be used in the generation of the KPIs. Various parameters 525 for the scenario the process is running may be input previously by a user interface such as the one illustrated in FIG. 4.

Figure 6:
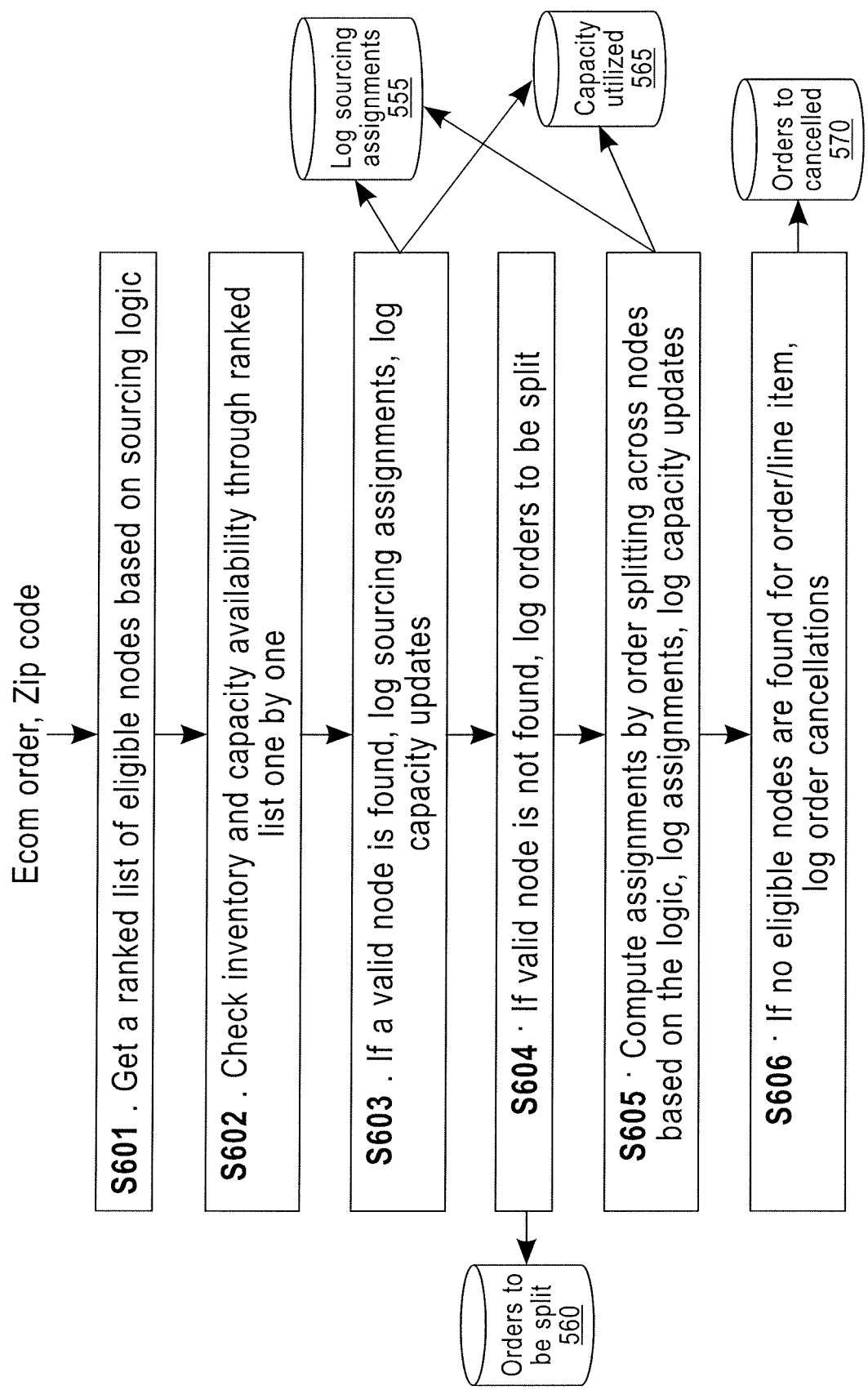
FIG. 6 shows a method of operating the sourcing simulator to perform order by order processing according to an exemplary embodiment of the invention.

FIG. 6 illustrates a method of processing orders according to an exemplary embodiment of the invention. Referring to FIG. 6, the method includes: getting a ranked list of eligible nodes (e.g., sourcing locations) based on the sourcing logic (S601), checking inventory and available capacity through the ranked list one by one (S602), and if a valid node is found, logging sourcing assignments in database 555 and logging capacity updates in database 565 (S603). If a valid node is not found, a log of orders to be split is generated and stored in database 560 (S604). The method further includes: computing assignments by order splitting across nodes based on the logic, logging assignments, and logging capacity updates (S605). If no eligible nodes are found for an order/line item, order cancellations are logged into database 570 (S606).

Figure 7:
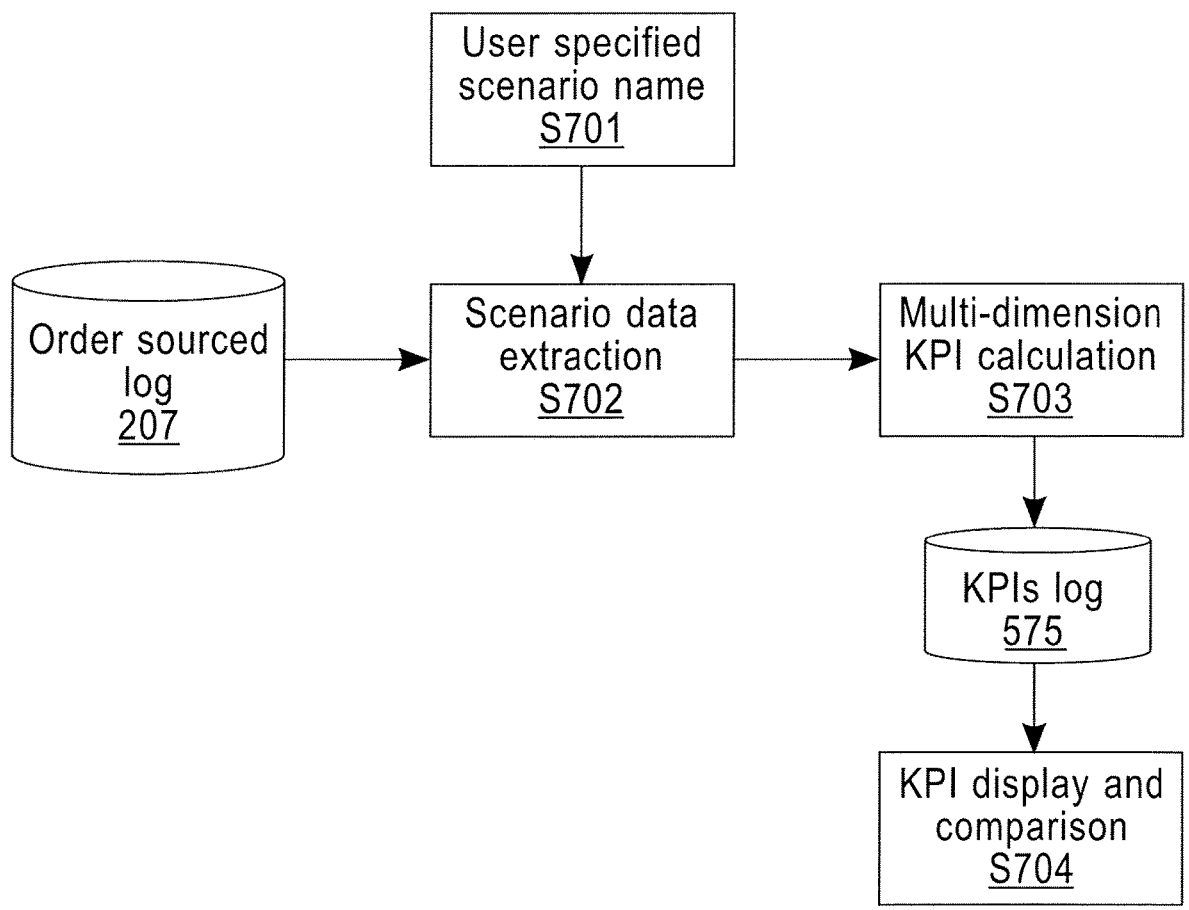
FIG. 7 shows a method of operating the sourcing simulator to generate KPIs according to an exemplary embodiment of the invention.

FIG. 7 illustrates generation of a KPI according to an exemplary embodiment of the invention. Referring to FIG. 7, the generation includes a user specifying a scenario name (S701), extracting scenario data from the specified scenario from the log of orders sourced (S702), and calculating one or more KPIs from the extracted data (S703). The calculated KPIs can be stored in the KPI database 575. The KPIs may be displayed for comparison (S704).

Figure 8:
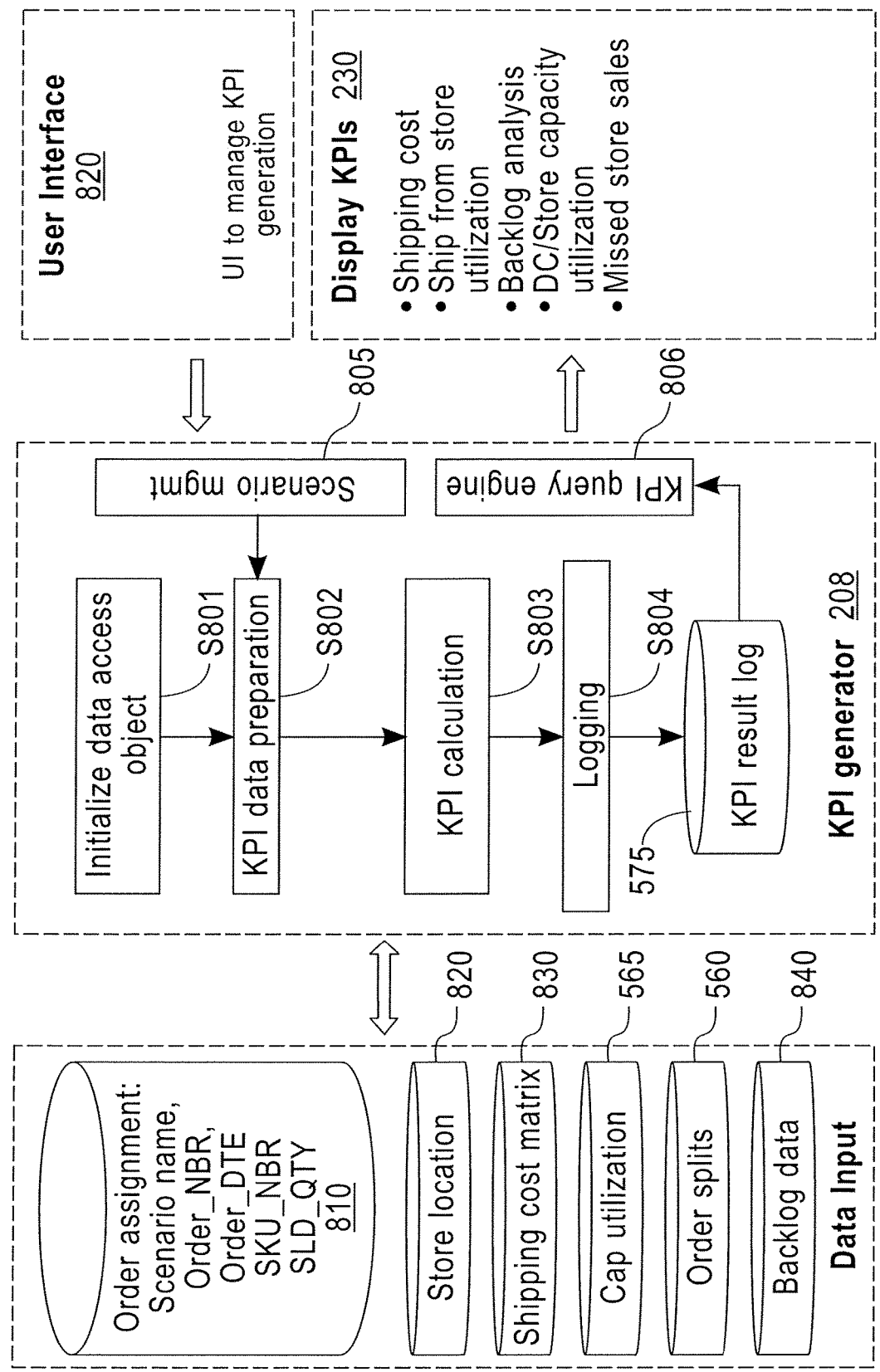
FIG. 8 show a process flow of the sourcing simulator for generating KPIs according to an exemplary embodiment of the invention.

FIG. 8 illustrates a KPI generator 208 generating KPIs according to an exemplary embodiment of the invention. First initialization of data access objects are performed (S801). Then a scenario manager 805 performs KPI data preparation using the objects and the data input (e.g., store locations 820, shipping costs 830, capacity utilizations 565, orders split 560, backlog data 840, etc.) (S802). The KPIs are calculated (S803) and then logged (S804) into a KPI result log 575. A KPI user interface 820 may be used to display the KPIs 230.

Figure 9:
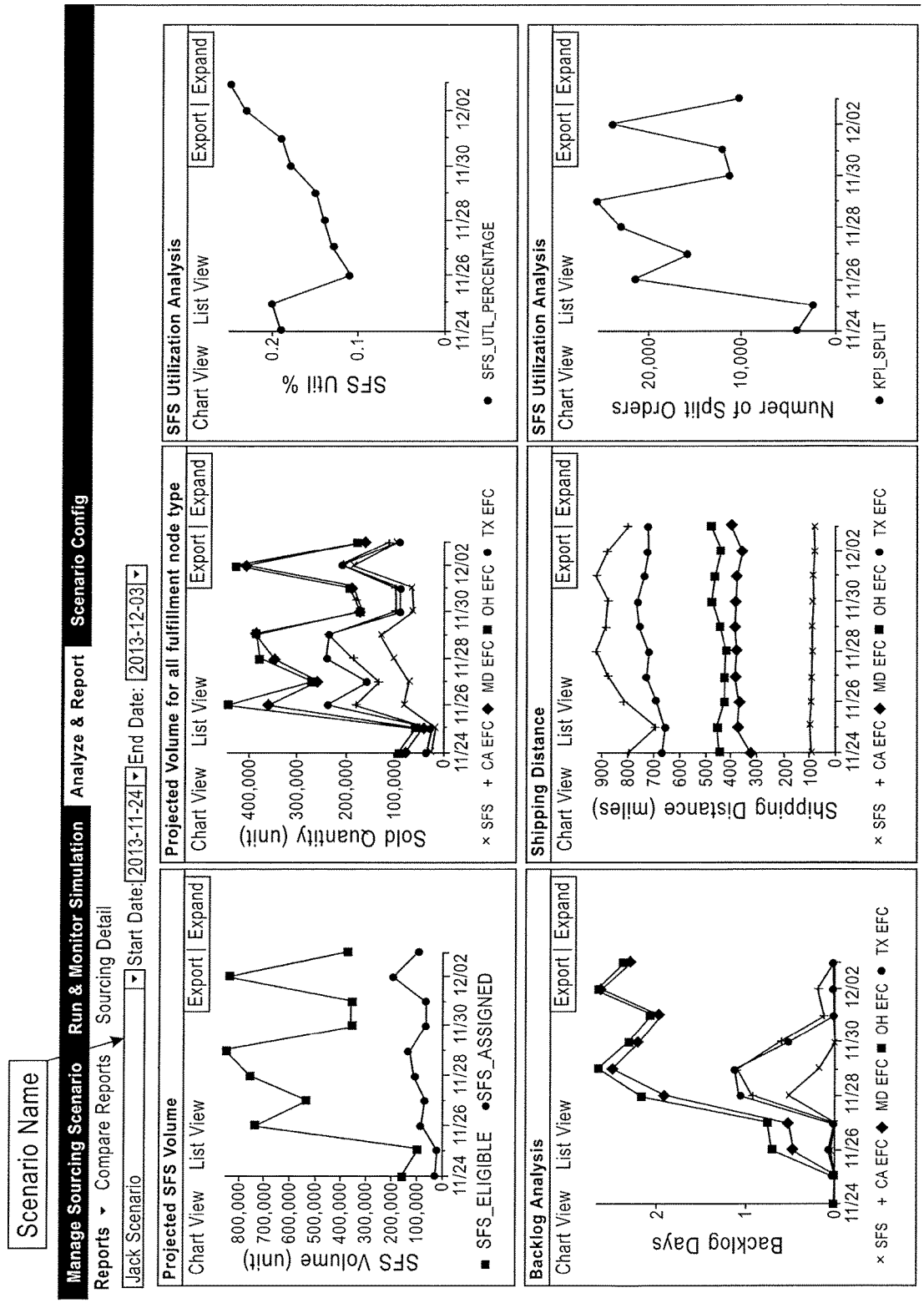
FIG. 9 shows an example of KPIs that can be presented graphically by the sourcing simulator.
Figure 10:
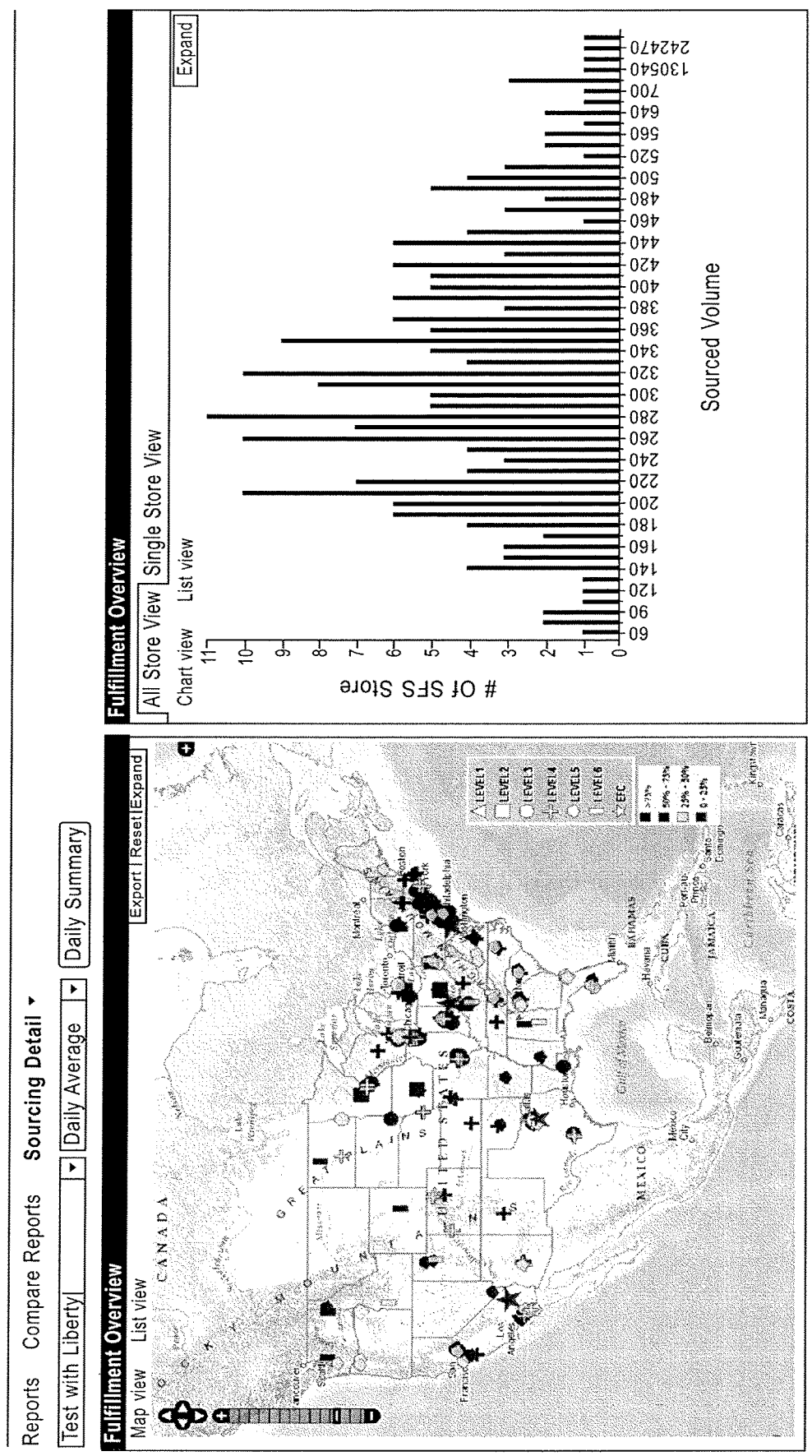
FIG. 10 shows an example of data that can be presented by the sourcing simulator.
Figure 11:
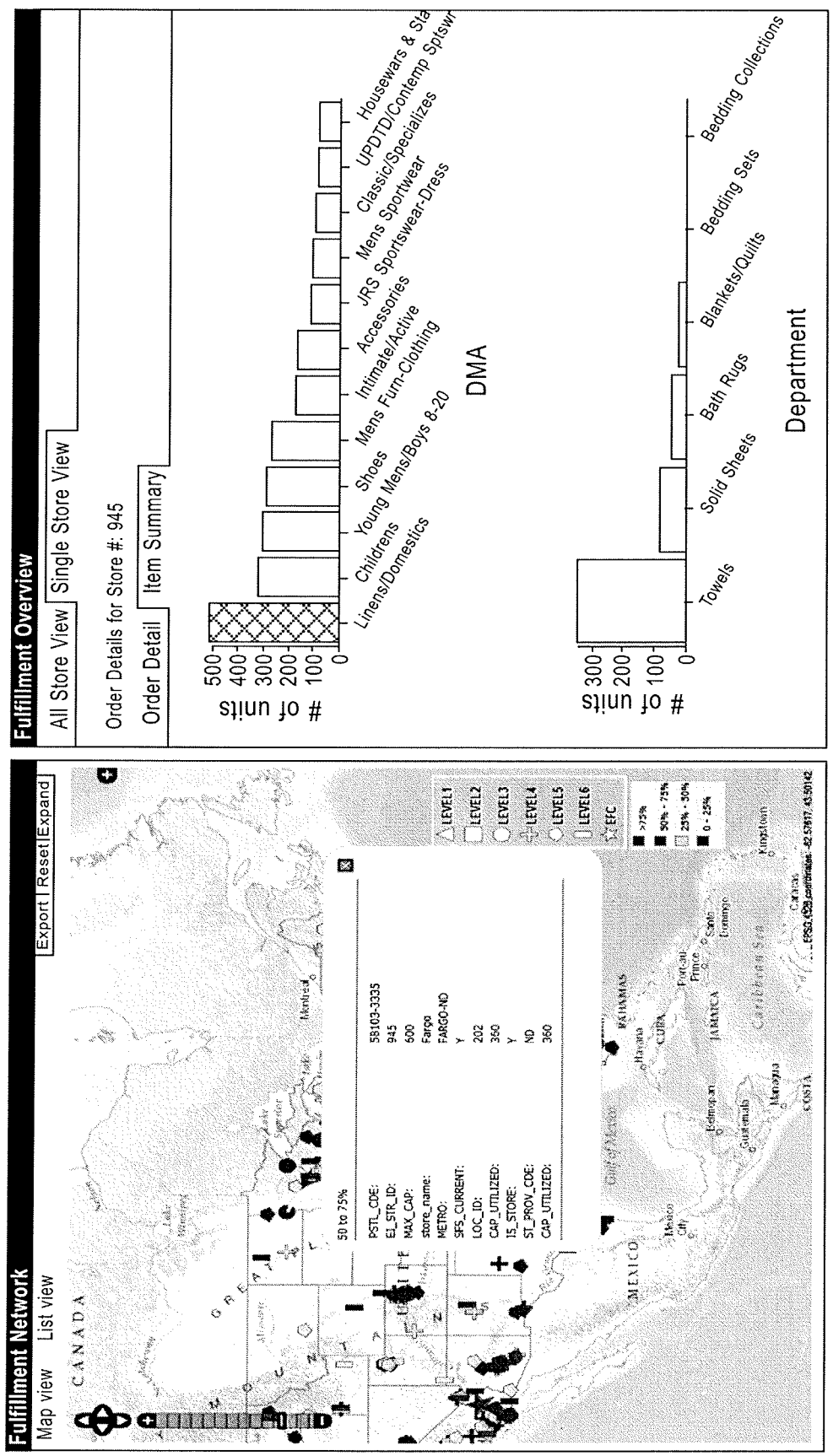
FIG. 11 shows an example of data that can be presented by the sourcing simulator.
Figure 13:
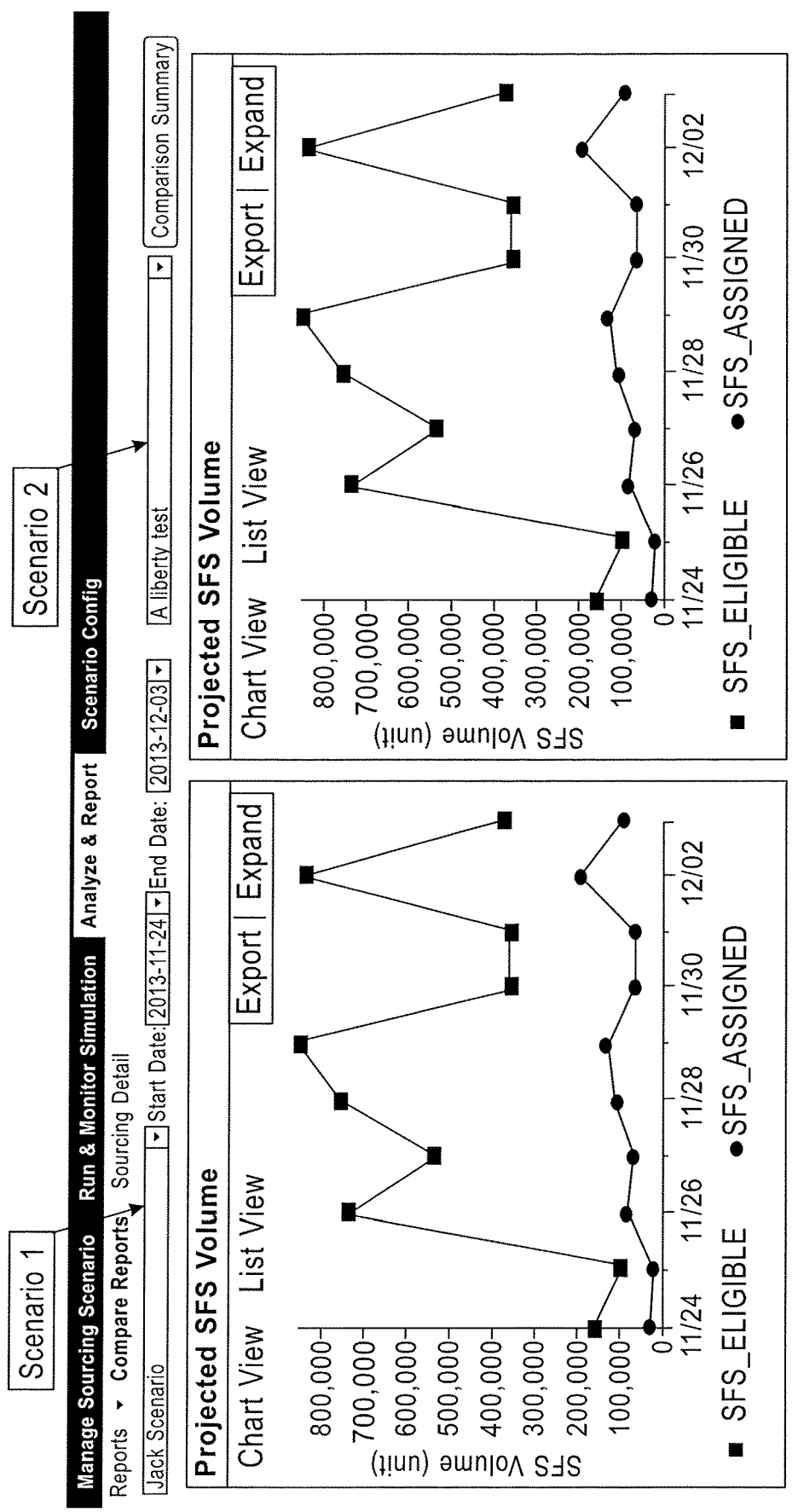
FIG. 13 shows an ability of the sourcing simulator to present KPIs of two scenarios in a side by side comparison.

FIG. 9 shows examples of KPIs that can be graphically presented by the system. FIGS. 10 and 11 shows examples of other data that can be presented by the system. KPIs can be computed at different granularities of time periods, order groups, node groups, product groups, etc. The simulator can perform a ship from store (SFS) utilization analysis to generate a projected SFS volume that indicates the number of items assigned to an SFS for fulfillment, and a SFS utilization percentage that indicates what % of SFS eligible items will be sourced using SFS. The simulator can determine distribution center utilization, which is a number of items processed by each distribution node, a backlog analysis, which is a number of orders backlogged over time due to the daily limit on the DC and SFS capacity, a shipping distance, which is an average shipping distance from the fulfillment node to the order zip code, a split analysis, which is the number of orders that are split (i.e., fulfilled by multiple nodes), and missed store sales, which is the potential sales in the stores that will be missed due to a sourcing policy. FIG. 12 shows additional KPIs that may be generated by the system. FIG. 13 shows that the system enables a side by side comparison of KPIs for two different scenarios.

Figure 14:
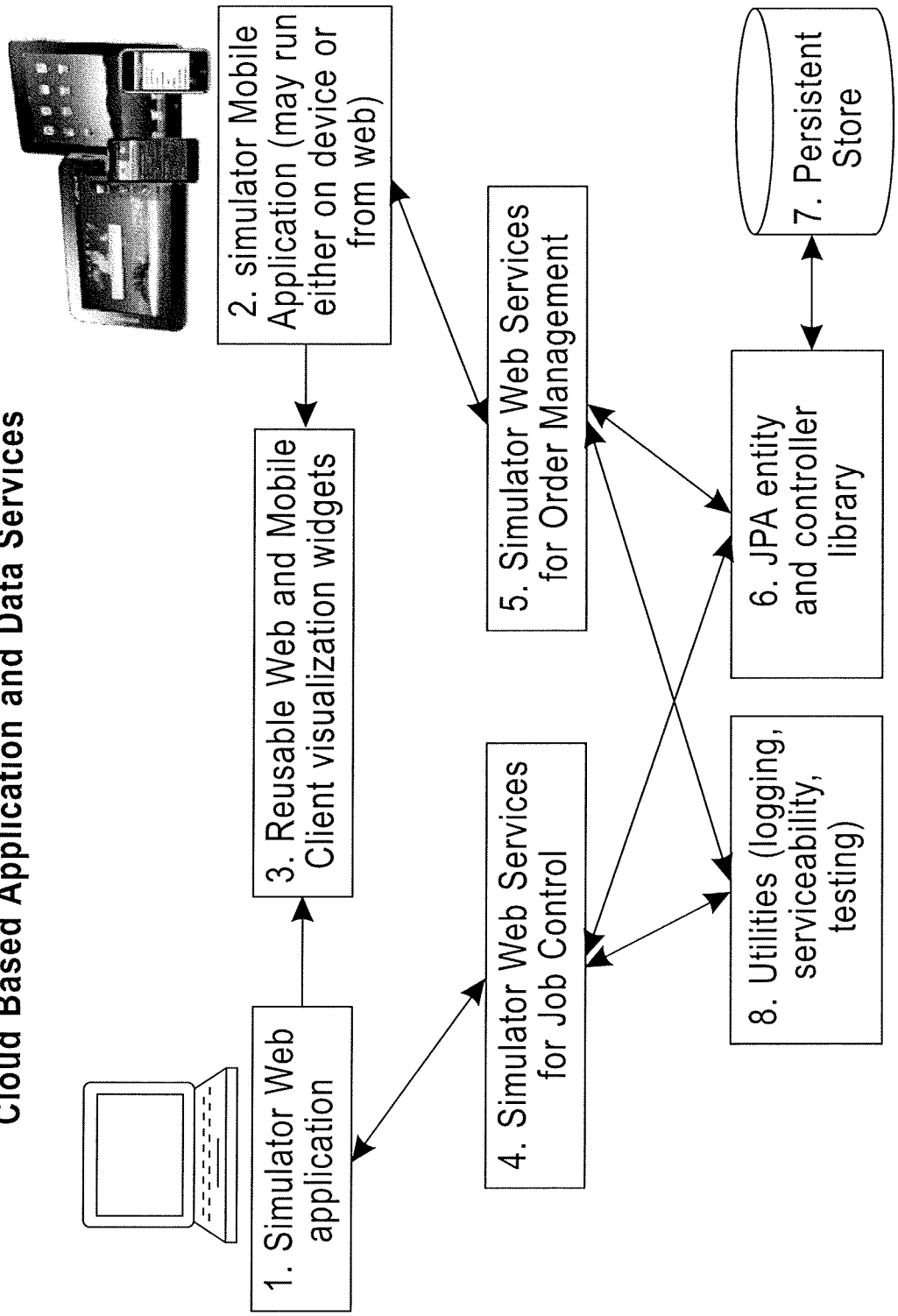
FIG. 14 shows an example of the system being implemented according to an exemplary embodiment of the invention.
Figure 15:
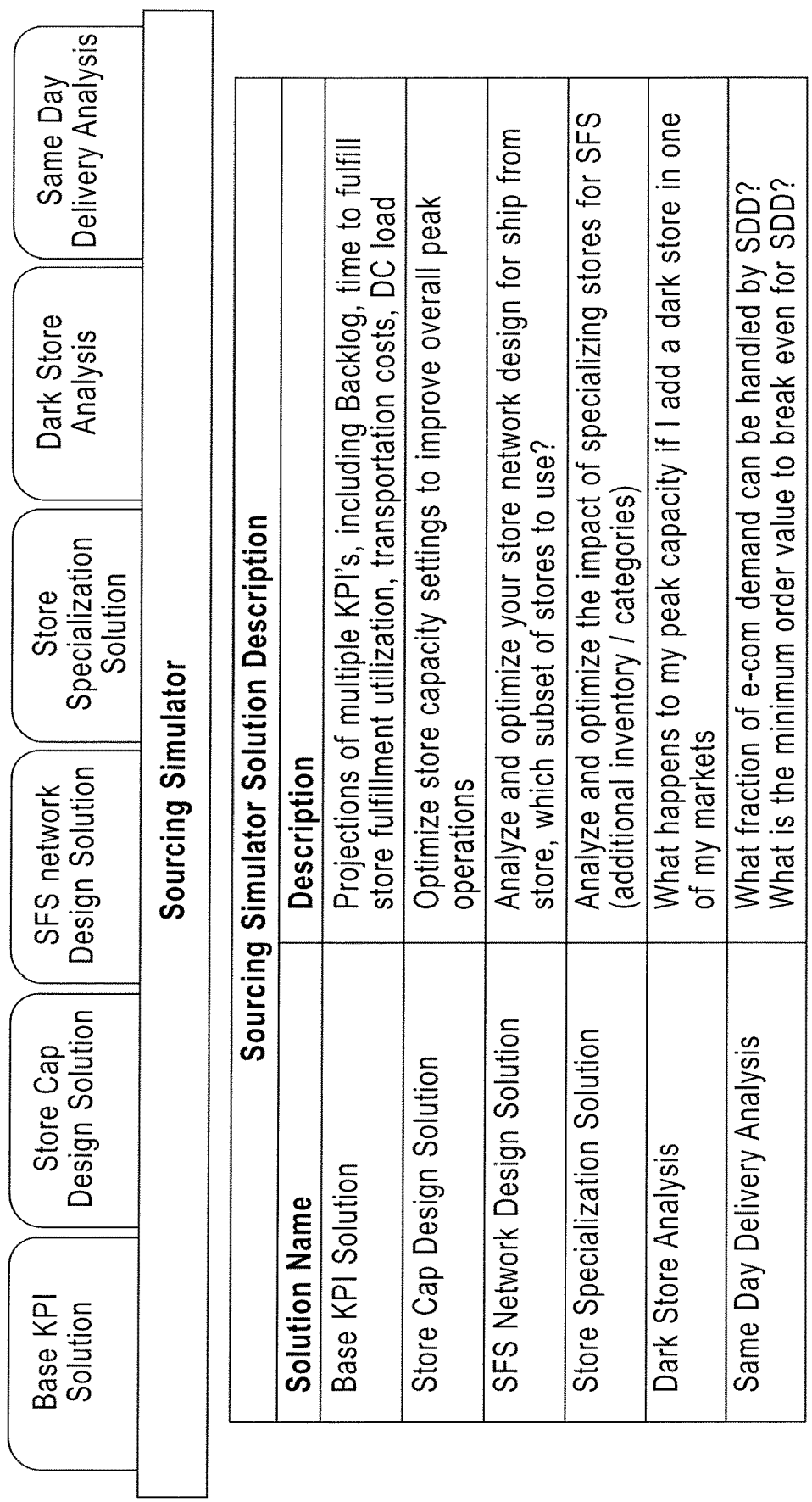
FIG. 15 illustrates some potential benefits provided by the sourcing simulator.

FIG. 14 illustrates some possible implementations of the system. For example, the Simulator Web Application 1 may provide the user interface for a user accessing via a standard web browser (e.g., CHROME, IE, FIREFOX). The Simulator Mobile Application 2 may provide a user interface from a mobile application (e.g., IOS, ANDROID). Both 1 and 2 make use of a reusable library of visualization widgets for both mobile and web use. This enables the applications to visualize charts and graphs of data provided by Representational state transfer REST web services in 4 and 5. Simulator Web Services 4 are provided for start/stop/status check and management of simulator runs using REST web services. Simulator Web Services 5 are provided for Create/Retrieve/Update/Delete of simulator business objects (example—sourcing scenario, backlog KPI) using rest services. Both 4 and 5 may connect to Java Persistence classes 6 to provide transactional connectivity to a persistent store 7. The persistent store 7 can be a relational database or other persistent store, such as a NoSQL database. The persistent store contains the rules guiding simulation and historical retail data such as orders and store location data. The system may include other utilities 8 to the programming stack for tracing, logging, and serviceability functions as well. FIG. 15 illustrates some potential benefits provided by the sourcing simulator.

In an exemplary embodiment of the inventive concept, the simulator enables a user to simulate the affects of changing a parameter that indicates whether a "keep it all together" or 'split mixed order" rule is to be applied. The "keep it all together" rule means the entire order is shipped from a single node regardless of the product class. For example, even though only some products are eligible for ship from store and other must be shipped from certain warehouse nodes simulator is capable of ignoring these facts to simulate what would happen if it was possible to ship all the items of a given order from a single node. Split mixed orders means dividing items in the order into groups according to similar shipping policies (e.g. ship from store eligible vs. not being eligible for ship from store) and dealing with each group of items separately. As a result of performing the simulation, the simulator generates one or more KPIs such as total shipping cost, number of units assigned to ship from store vs. warehouses, backlog on nodes. While use of the "keep it all together" rule leads to lower shipping cost, it leads to heavy load on certain nodes leading to a backlog and that leads to increased future shipping costs. For example, if a business has promised its customer two-day shipping, due to the backlog, the business may need to pay higher shipping costs to expedite the shipment in order to meets the 2-day shipping requirement. The "split mixed order" rule leads to increased shipping cost in the short term, however it avoids build up of backlog on certain nodes, thereby avoiding future expediting shipping costs.

In an exemplary of the inventive concept, the simulator enables a user to simulate to consider a varying safety stock level. This safety stock level refers to the minimum number of units a store needs to carry for presentation. So when the store inventory hits the safety stock threshold, the item is not eligible for ship from store. With the simulator, the user is allowed to set up different values from safety stock for nodes starting from 0 to any value per SKU. With no safety stock, all the inventory in the store for an item is eligible for online orders leaving the possibility of lost in-store sales. On the other hand, a very high value of safety stock may mean lost online sales. As a result of performing the simulation, the simulator generates a KPI indicating the number of missed store sales, which helps the user to understand what safety stock values are useful.

In an exemplary embodiment of the inventive concept, the simulator allows a user to vary node group priorities. Distribution nodes may be divided into different distribution groups (e.g. west coast stores, east coast stores, all stores, e-fulfillment centers EFCs, etc.) based on past or present user provided input to the simulator. For a class of products and the region of order destination, as part of sourcing rule specification, a user specifies the sequence of distribution groups (e.g. stores first then EFCs, or EFC first and then east coast stores and then west coast stores, etc.) for finding eligible nodes for shipping and then resolving allocation based on the priority in the sequence of groups. Within each group, the nodes may be sorted by different criteria such as distance. For example, if the west coast stores have priority over east coast stores, and the west coast stores number 5 stores, if store 3 is the closet to the destination of the shipment, then the simulator assumes that orders are being shipped from store 3 until store 3 dips below its safety stock. Once this happens, the simulator assumes that orders are shipped from the next closest west coast store. Once all west coast have dipped below their safety stock levels, the simulator next considers the closest east coast store. Many retailers fix their sourcing rule strategy and use it without knowing how different sourcing rules (distribution group sequence) will pan out. As a result of performing the simulation, the simulator may generate KPIs indicating the number of units assigned to SFS, the SFS utilization compared to EFCs, and the amount of backlog, which can help the retailer plan an SFS strategy.

In an exemplary embodiment of the inventive concept, the simulator enables a user to simulate the affects of changing a parameter that indicates whether a "consolidate" rule or multiple splits" rule is to be applied. When the "consolidate" rule is applied, the sourcing method tries to minimize the number of shipments for each order.

For example, if a same destination made multiple orders, it may be possible to consolidate some or all of these orders to save on shipping costs. When the "multiple splits" rule is applied, the sourcing method tries to find an assignment line by line (on a per item basis) in the order according the priority sequence of the nodes. For example, even if node 1 could ship item 1 and item 2 of a given order, the simulator can produce KPIs to help a user determine whether there is any benefit to having item 1 shipped by node 1 and item 2 shipped by node 2.

In an exemplary embodiment of the inventive concept, the simulator is capable of considering the affect of adding additional distribution nodes with some pre-defined amount of inventory. With the simulator, a retailer can see how the addition of a new store will impact order distribution, inventory, and shipping costs.

In an exemplary embodiment of the inventive concept, the simulator is capable of applying an unforeseen event to the simulation. Examples of unforeseen events include inclement weather (e.g., snowstorm, flood, etc.) and ramping capacity up or down. For example, inclement weather could adversely affect the capacity (number of units processed by a give node) of a given node, while doubling the number of workers at a giving node could positively affect the capacity. The simulator enables a user to apply one or more of these events to one or more nodes. As a result of performing the simulation, the simulator may generate KPIs indicating enabling the user to determine the affects of these events. For example, if a snowstorm at a high priority node is simulated to cause an excessive backlog at a given node, the user can decide to implement more shipment splitting during the winter.

Figure 16:
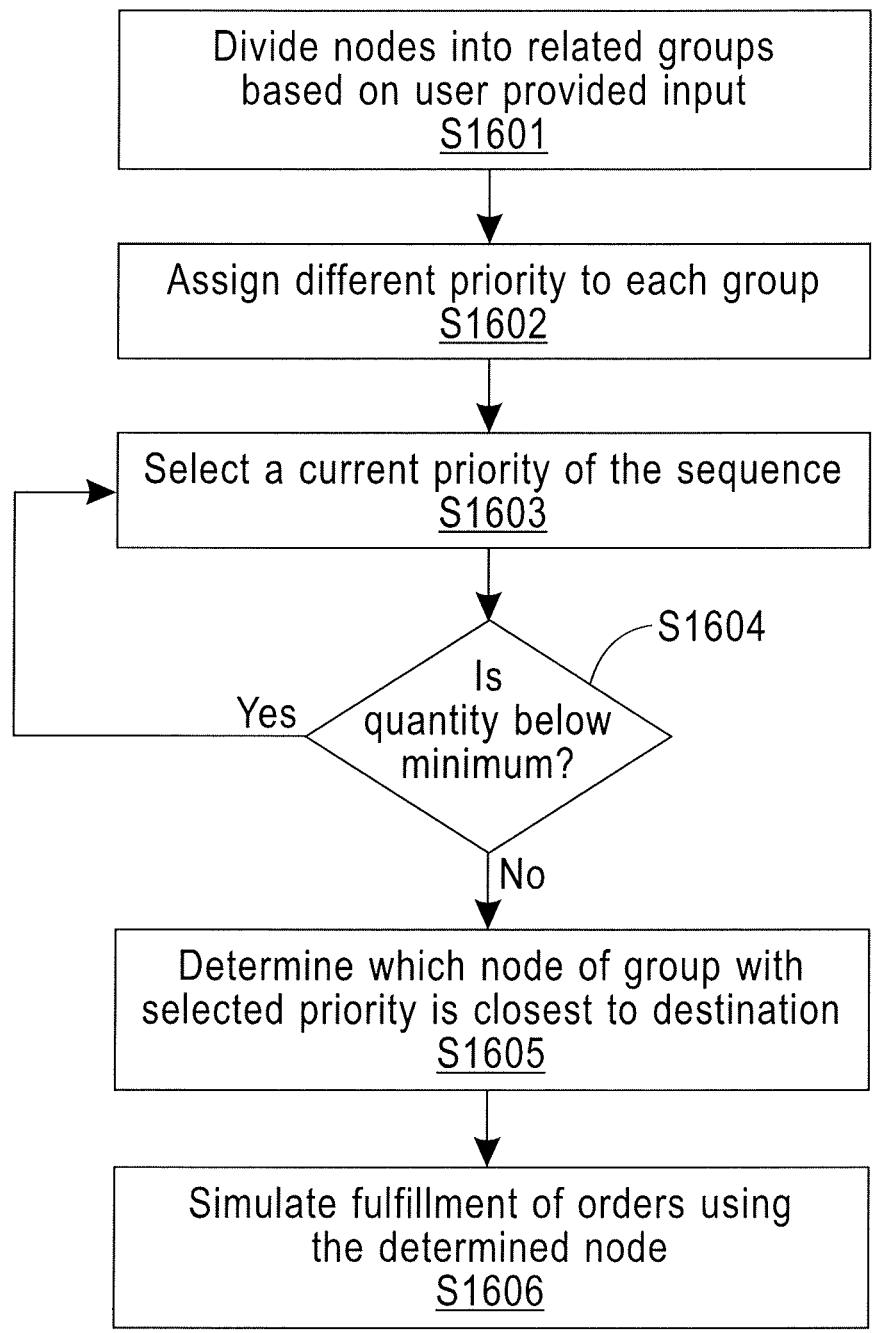
FIG. 16 illustrates a method of simulating order fulfillment according to an exemplary embodiment of the invention.

FIG. 16 illustrates a method of simulating fulfillment of orders according to an exemplary embodiment of the invention. The method includes dividing physical distribution nodes into related groups based on user provided input (S1601). Each node has an inventory of products and is capable of shipping the products to destinations in response to receipt of a corresponding order. The method includes assigning a different priority to each group to generate an ordered sequence of priorities (S1602). For example, the sequence may be ordered from highest priority to lowest priority. The method includes selecting a current priority of the sequence (S1603). Thus, the highest priority is selected first when the sequence is ordered from highest to lowest. The selected priority is associated with a first group among the groups. The method determines whether quantities of products in the orders being simulated at the nodes of the first group are below a minimum required for each of the nodes (S1604). For example, as long as at least one of the nodes has enough of the product (i.e., its quantity is above its safety stock level), the method can then determine which node of the group is closest to the destination of the order (S1605). Then fulfillment of orders can then be simulated using the node that was determined to be closest assuming that the quantity of the product at the node is above its safety stock level (S1606). Once the quantity at the closest node reaches or goes below its safety stock level, the next closest node in the first group is simulated as fulfilling the orders. Once no more nodes remain within the first group having quantities above their respective safety stock levels, then method selects the next priority in the sequence (S1603). In an exemplary embodiment, a process is executed in the background that periodically updates the quantity of the products at each node based on actual inventory data from those nodes.

Figure 17:
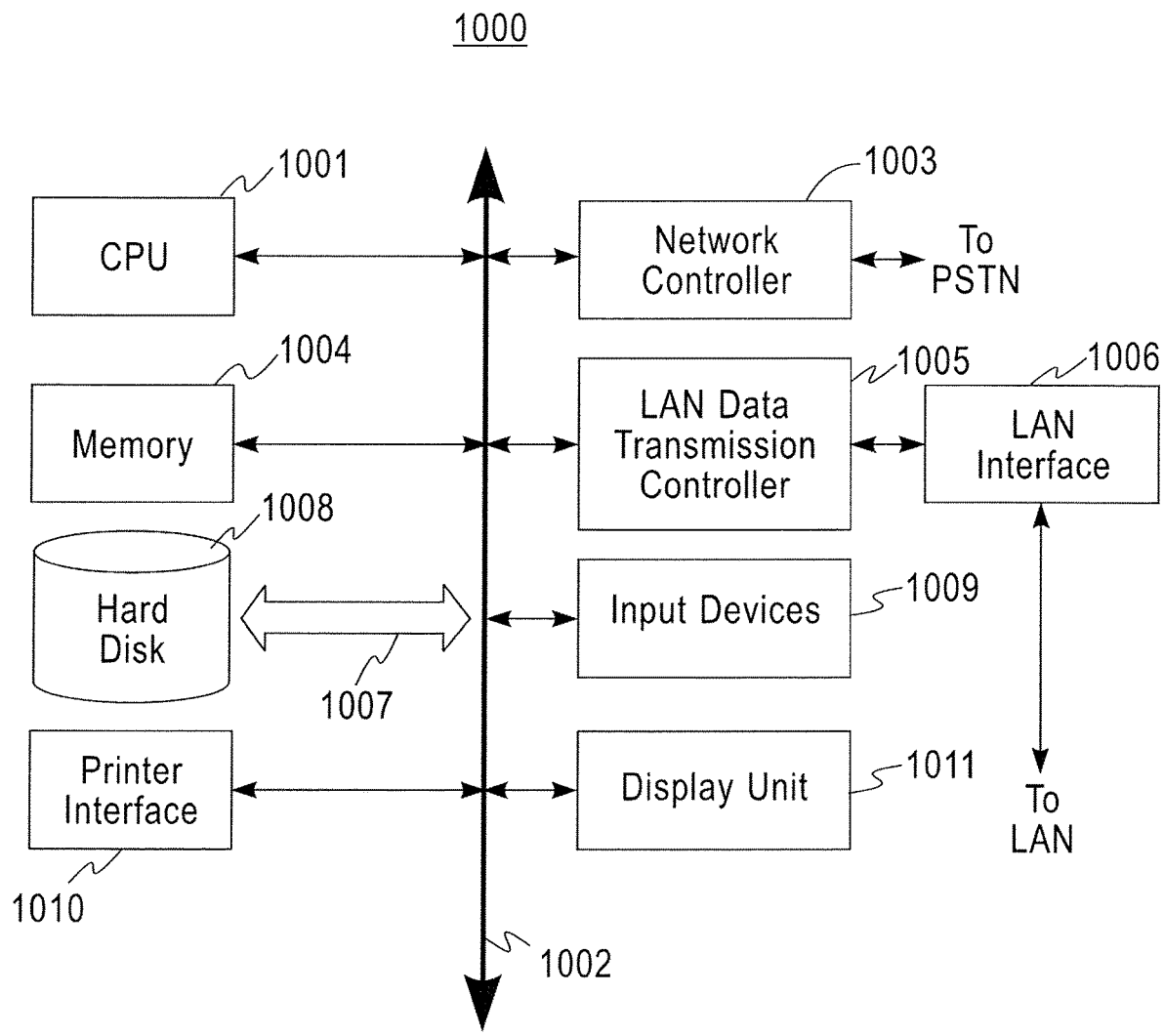
FIG. 17 illustrates an example of a computer system capable of implementing methods and systems according to embodiments of the disclosure.

FIG. 17 illustrates an example of a computer system, which may execute any of the above-described methods, according to exemplary embodiments of the invention. For example, the methods and units described above may be implemented in the form of a software application running on the computer system. Further, portions of the methods may be executed on one such computer system, while the other portions are executed on one or more other such computer systems. Examples of the computer system include a mainframe, personal computer (PC), a handheld computer, a server, etc. The software application may be stored on a computer readable media (such as hard disk drive memory 1008) locally accessible by the computer system and accessible via a hard wired or wireless connection to a satellite or a network, for example, a local area network, or the Internet, etc.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008 (e.g., a digital video recorder), via a link 1007. CPU 1001 may be the computer processor that performs the above described methods.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product to simulate fulfillment of orders for a plurality of physical distribution nodes, the computer program product comprising a computer readable storage medium having program instructions embodied therewith, the program instructions executable by a computer to perform a method comprising:
   presenting, by a computer program of the computer program product, a user interface including a demand projection slider that enables a user to specify a percentage to increase or decrease demand, wherein the computer program divides the nodes into related groups and assigns a different priority to each group to generate a sequence of priorities ordered from highest to lowest, where each node has an inventory of products including a given product and is capable of shipping the products to destinations in response to receipt of a corresponding order;
   selecting, by the computer program, a first priority of the sequence;
   determining, by the computer program, a first group among the groups having the first priority;
   determining, by the computer program, the nodes of the first group having a quantity of the given product not below a minimum quantity in corresponding safety stock data at each of the nodes;
   determining, by the computer program, which one of the determined nodes is closest to a destination of an order for the given product;
   running, by the computer program, a process in the background that periodically updates a quantity of the given product at the one node based on electronic commerce (ECOM) orders for the given product stored in a database; and
   simulating, by the computer program the one node fulfilling a first number of current orders for the given product during a current period base on the quantity of the given product at the one node,
   wherein the first number is based on the percentage and a second number of previous orders for the given product in which the computer program simulated fulfillment of, during a previous period that is previous to the current period.

2. The computer program product of claim 1, the method further comprising:
   selecting, by the computer program, a next priority of the sequence when all the nodes of the first group have a quantity of the given product below the Minimum quantity; and
   simulating, by the computer program, a second group among the groups having the next priority fulfilling the orders for the given product.

3. The computer program product of claim 1, wherein the simulating comprises:
   determining, by the computer program, which of the nodes of the first group is closest to the destinations of the orders and has a quantity of the given product above the minimum required quantity; and
   simulating, by the computer program, the determined node fulfilling the orders for the given product.

4. The computer program product of claim 1, wherein the simulating comprises:
   querying, by the computer program, the user to change the minimum required quantity using the user interface; and
   simulating, by the computer program, the first group fulfilling the orders for the given product using the changed minimum required quantity.

5. The computer program product of claim 1, the method further comprising:
   querying, by the computer program, the user to change one of the priorities using the user interface;
   generating, by the computer program, a new sequence of the priorities ordered from highest to lowest based on the change;
   selecting, by the computer program, a first priority of the new sequence; and
   simulating, by the computer program, a second group among the groups having the first priority of the new sequence fulfilling the orders.

6. The computer program product of claim 1, further comprises querying the user to add at least one temporary node with an inventory of products to the physical distribution nodes using the user interface.

7. The computer program product of claim 1, wherein prior to the simulating, the method comprises querying the user to reduce or increase an average number of units processed by one of the nodes using the user interface.

8. The computer program product of claim 1, wherein prior to the simulating, the method comprises querying the user to designate that at least one of the orders be split into multiple orders for fulfillment by at least two of the nodes using the user interface.

9. The computer program product of claim 1, wherein prior to the simulating, the method comprises querying the user to designate a plurality of the orders be consolidated into a single order for fulfillment by a single one of the nodes using the user interface.

* * * * *